May 28, 1957 G. R. DUNCAN 2,793,614
AUTOMATIC MULTIPLE EGG LAYING AND COOLING APPARATUS
Filed Nov. 16, 1954
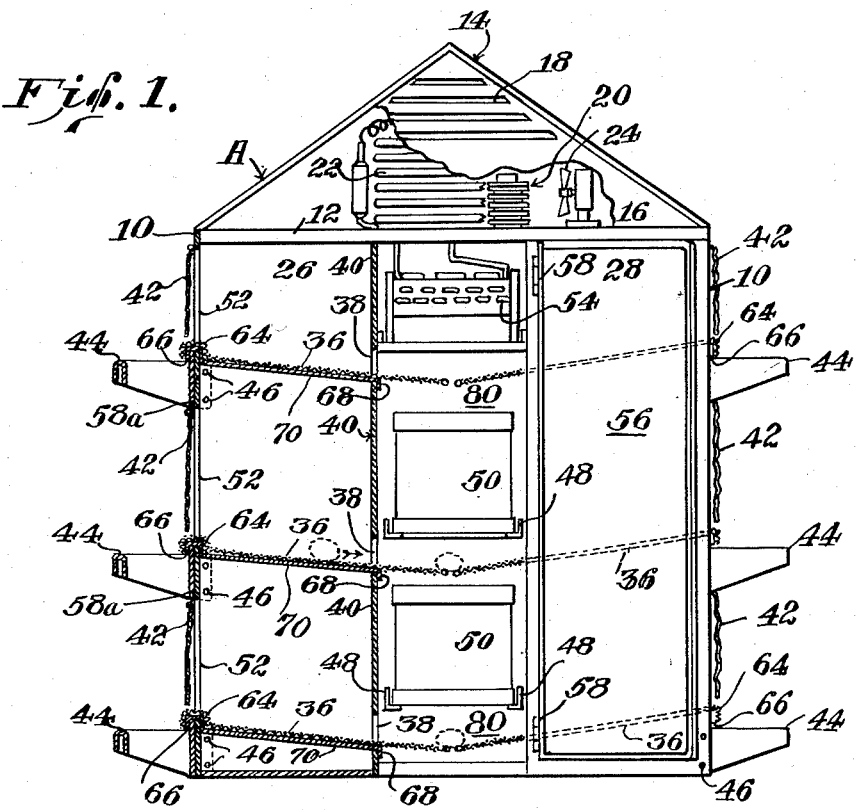
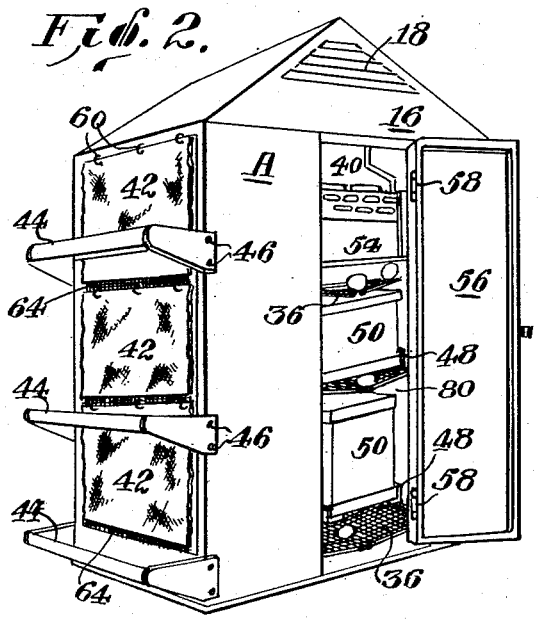
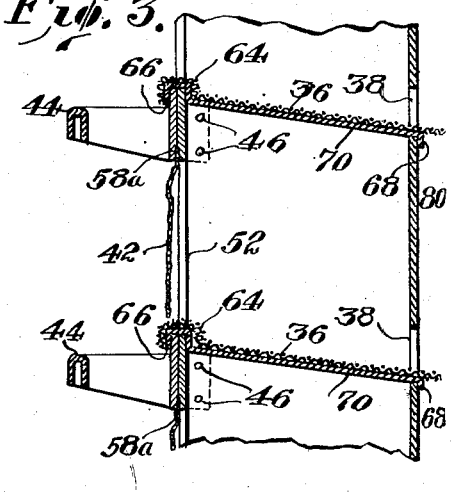
INVENTOR.
GEORGE R. DUNCAN.

United States Patent Office 2,793,614
Patented May 28, 1957

2,793,614

AUTOMATIC MULTIPLE EGG LAYING AND COOLING APPARATUS

George R. Duncan, Washington, Mo.

Application November 16, 1954, Serial No. 469,176

10 Claims. (Cl. 119—48)

This invention relates to a structure for automatically conveying eggs from a plurality of compartments or nests to a cooling compartment where the eggs are cooled and maintained at the proper cooling temperature.

One of the principal objects of this invention is to provide an egg laying and egg cooling apparatus wherein the eggs move along a single flat but inclined surface from the several compartments where the eggs are laid to the compartment where the eggs are cooled and maintained in cooled condition.

Another object is to provide mechanical cooling means for eggs including a motor driven fan which performs the dual function of circulating fresh air to the laying compartment, and cooling the evaporator coil of the refrigerating mechanism.

A further object is to provide a single substantially flat surface upon which the eggs are deposited and which allows the eggs to roll to the storage compartment by gravity on said surface.

An additional object is to provide a combined egg laying and cooling apparatus which employs no moving parts whereby the eggs roll from the laying nests directly into the cooling compartment.

Other objects will appear hereinafter throughout the specification.

In the drawings:

Figure 1 is a front elevation of the apparatus partly in section and partly broken away.

Figure 2 is a perspective view of the apparatus with the egg cooling compartment door in open position; and Figure 3 is an enlarged detailed vertical section of the entrance to one of the laying nests.

The present apparatus permits a gravity roll of each egg as it is laid, into a mechanical refrigerator or cooler. Provision is made for a plurality of nests arranged in vertical tiers on opposite sides of a mechanical cooling compartment. The inclined surfaces on which the eggs roll from the laying compartment to the cooling compartment is without sides, in order to prevent the eggs from rolling into contact with such sides and stopping before they reach the storage compartment.

Referring now to the drawings, as shown in Figure 1, the structure as a whole is indicated by the letter A. This structure consists of a housing or cabinet which is provided with sides 10, an upper ceiling or floor 12 and inclined roof portions 14. Forming part of the structure is a triangular front portion 16 that is provided with a plurality of horizontally spaced louvers 18. Mounted on the floor 12 is a conventional electric refrigerating mechanism 20 including a compressor, the usual motor, condenser coils 22 and a fan 24.

Referring to Figures 1 and 3, the shelves 70 are each provided with a U-shaped side edge 66 which hooks over the side of the cabinet wall, and with a down-turned flange 68 which hooks over the partition wall 40. Each shelf 70 supports a substantially rigid wire netting 36 having at the left of said netting a U-shaped side edge 64 extending over the side edge 66. As viewed in Figures 1 and 3, the netting 36 extends to the central point, whereby when an egg is laid on the netting 36, it rolls toward the central point and rests at this point as shown in dotted lines in Figure 1. It will be noted by reference to these figures that there are a series of vertical tiers 26 and 28, each of these tiers being separated into laying spaces.

Each pair of netting surfaces extends into the cooling compartment 80 through the openings 38. These openings are located in the partition walls 40 only one of which is shown in Figure 1, it being understood that the construction on the right side of the cooling compartment is identical with that shown on the left side of this compartment. Flexible material, not shown, may close each of these openings, so that the egg in rolling on the conveyor surface 36 will push the material aside, after which the material will assume its normal vertical position.

This material may be similar to, but smaller in size than the several drapes or curtains 42 covering openings 52 which form the entrance to the nests.

It will be understood that, although only one nest is shown on each wire netting 32, several may be arranged horizontally on each of these, in order to accommodate at one time several laying hens.

Mounted below each series of horizontally arranged nests is a perch 44 which is, as shown, of U-shaped configuration, the legs being fastened by suitable fastening means such as rivets 46 to the front of the apparatus.

Mounted above several of the inclined conveyors 36, and within the cooling compartment, are pairs of angle members 48, each pair being adapted to support an egg crate 50. Each egg crate may be slid into position, as shown in Figure 1, after it has been loaded with eggs which have rolled into the cooling compartment, such eggs being shown in Figure 1 as located below the crates 50. In other words, when there has been an accumulation of eggs within the cooling compartment one of the crates is slid outwardly on its pair of angle members 48 and is filled or partially filled with eggs after which it is slid back into place.

The cooling compartment is provided with a door 56 that is hingedly mounted at 58 to the front portion of the cooler.

It will be noted that the curtains 42 are clamped to the structure by means of the slots 58a as shown in Figure 3, or they may be suspended by rings 60 as shown in Figure 2.

The advantages of the present cvonstruction over those of the prior art include the following:

The provision of a single flat inclined surface located beneath the nests whereby each egg may roll, without being obstructed, into the lowest point of said conveyor, i. e., the point in the cooling compartment which forms the reversed apex of a pair of said conveying surfaces 36. It will be noted that no sides or other obstructing means are provided on the egg conveyor, so that, once the egg is deposited on the conveyor, it rolls without obstruction to the lowest point along the conveyor, this point being within the egg cooling compartment.

It will be appreciated that as the air is cooled by contacting evaporator coils 54, the air will tend to settle to the bottom of the cooling compartment. The air warmed by the body heat of the hens in the laying compartments will tend to rise through the nettings 36 and outlet means (not shown) in ceiling 12 adjacent the laying compartments. The natural movements of the air thus sets up a circulating system so that the warmer air will rise until it is above ceiling 12 and passes out louvers 18 at the apex of the roof 14, and air will also pass through inlet means (not shown) adjacent the refrigerating mechanism 20 and be cooled by evaporator coils 54 whereupon it settles to the bottom of the cooling compartment, drawing additional air through the inlet means behind it. As the cooler air settles in the cooling compartment it will displace and gently force the warmer air upwardly. The warmer air tends to rise due to the slight pressure exerted by the cooler air and due to its natural tendency.

Fan 24 is a conventional refrigerator fan which cools mechanism 20 and also aids the circulating system described above.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In an apparatus wherein freshly laid eggs may be deposited and cooled, comprising a cooling compartment, at least one egg laying compartment and a refrigerating mechanism, said cooling compartment being horizontally disposed with respect to said egg laying compartment, an apertured partition separating said compartments, at least one inclined perforated conveyor surface extending downwardly from said egg laying compartment through said apertured wall into said cooling compartment, said refrigerating mechanism having evaporator coils disposed in cooling relationship with respect to said cooling compartment, said compartments adapted and constructed to allow cooling air to circulate from said cooling compartment to said egg laying compartment.

2. In an apparatus wherein freshly laid eggs may be deposited and cooled, comprising a cooling compartment, a plurality of egg laying compartments and a refrigerating mechanism, said cooling compartment being horizontally disposed with respect to said egg laying compartments, an apertured partition separating said cooling compartment and said egg laying compartments, inclined perforated conveyor surfaces extending downwardly from each said egg laying compartment through said apertured wall into said cooling compartment, said refrigerating mechanism having evaporator coils disposed in cooling relationship with respect to said cooling compartment, said apparatus being adapted and constructed to allow cooling air to circulate from said cooling compartment to said egg laying compartments.

3. In an apparatus wherein freshly laid eggs may be deposited and cooled, comprising a cooling compartment, a plurality of egg laying compartments horizontally and vertically spaced with respect to one another, and a refrigerating mechanism, said cooling compartment being horizontally disposed with respect to said egg laying compartments, an apertured partition separating said cooling compartment and said egg laying compartments, inclined perforated conveyor surfaces extending downwardly from each said egg laying compartment through said apertured wall into said cooling compartment, said refrigerating mechanism having evaporator coils disposed in cooling relationship with respect to said cooling compartment, said apparatus being adapted and constructed to allow cooling air to circulate from said cooling compartment to said egg laying compartments.

4. In an apparatus wherein freshly laid eggs may be deposited and cooled, comprising a cooling compartment, at least one egg laying compartment and a refrigerating mechanism, said cooling compartment being horizontally disposed with respect to said egg laying compartment, an apertured partition separating said compartments, at least one inclined perforated conveyor surface extending downwardly from said egg laying compartment through said apertured wall into said cooling compartment, means for supporting at least one egg crate in said cooling compartment, said refrigerating mechanism having evaporator coils disposed in cooling relationship with respect to said cooling compartment, said compartments adapted and constructed to allow cooling air to circulate from said cooling compartment to said egg laying compartment.

5. In an apparatus wherein freshly laid eggs may be deposited and cooled, comprising a cooling compartment, a plurality of egg laying compartments and a refrigerating mechanism, said cooling compartment being horizontally disposed with respect to said egg laying compartments, an apertured partition separating said cooling compartment and said egg laying compartments, inclined perforated conveyor surfaces extending downwardly from each said egg laying compartment through said apertured wall into said cooling compartment, means for supporting a plurality of egg crates in said cooling compartment, said refrigerating mechanism having evaporator coils disposed in cooling relationship with respect to said cooling compartment, said apparatus being adapted and constructed to allow cooling air to circulate from said cooling compartment to said egg laying compartments.

6. In an apparatus wherein freshly laid eggs may be deposited and cooled, comprising a cooling compartment, a plurality of egg laying compartments and a refrigerating mechanism, said cooling compartment being horizontally disposed with respect to said egg laying compartments, an apertured partition separating said cooling compartment and said egg laying compartments, inclined perforated conveyor surfaces extending downwardly from each said egg laying compartment through said apertured wall into said cooling compartment, means for supporting egg crates above each of said conveyor surfaces, said refrigerating mechanism having evaporator coils disposed in cooling relationship with respect to said cooling compartment, said apparatus being adapted and constructed to allow cooling air to circulate from said cooling compartment to said egg laying compartments.

7. In an apparatus wherein freshly laid eggs may be deposited and cooled comprising a cabinet having a cooling compartment, at least one tier of nesting compartments being horizontally disposed with respect to said cooling compartment, an apertured partition separating said tier and said cooling compartment, inclined perforated conveyor surfaces extending downwardly from said egg laying compartment through said partition into said cooling compartment, a refrigerating mechanism located adjacent said cooling compartment, said mechanism having evaporator coils disposed in cooling relationship with respect to said cooling compartment, said cabinet being constructed and adapted to allow cooling air to circulate from said cooling compartment through said tier.

8. In an apparatus wherein freshly laid eggs may be deposited and cooled comprising a cabinet having a cooling compartment, at least one tier of nesting compartments being horizontally disposed with respect to said cooling compartment, an apertured partition separating said tier and said cooling compartment, inclined perforated conveyor surfaces extending downwardly from said egg laying compartment through said partition into said cooling compartment, means for supporting egg crates above each of said conveyor surfaces, a refrigerating mechanism located adjacent said cooling compartment, said mechanism having evaporator coils disposed in cooling relationship with respect to said cooling compartment, said cabinet being constructed and adapted to allow cooling air to circulate from said cooling compartment through said tier.

9. In an apparatus wherein freshly laid eggs may be deposited and cooled comprising a cabinet having a centrally located cooling compartment, tiers of nesting compartments being horizontally disposed with respect to said cooling compartment, apertured partitions separating each of said tiers from said cooling compartment, a series of inclined perforated conveyor surfaces opposing one another and extending downwardly from each tier of egg laying compartments through said partition into said cooling compartment, each of said series of said surfaces being opposed to another series of said surfaces to form inverted apices in said cooling compartment, means for supporting egg crates above each of said apices, a refrigerating mechanism located adjacent said cooling compartment, said mechanism having evaporator coils disposed in cooling relationship with respect to said cooling compartment, said cabinet being constructed and adapted to allow cooling air to circulate from said cooling compartment through said tiers.

10. In an apparatus wherein freshly laid eggs may be deposited and cooled comprising a cabinet having a centrally located cooling compartment, tiers of nesting compartments being horizontally disposed with respect to said cooling compartment, apertured partitions separating each of said tiers from said cooling compartment, a series of inclined perforated conveyor surfaces opposing one another and extending downwardly from each tier of egg laying compartments through said partition into said cooling compartment, each of said series of said surfaces being opposed to another series of said surfaces to form inverted apices in said cooling compartment, means for supporting egg crates above each of said apices, a refrigerating mechanism located adjacent said cooling compartment, said mechanism having evaporator coils disposed in cooling relationship with respect to said cooling compartment, said refrigerating mechanism including a fan, inlet and outlet means extending in said cabinet adjacent said mechanism and said tiers, said cabinet being constructed and adapted to allow air to circulate through said evaporator coils down said cooling compartment and up through said tiers.

References Cited in the file of this patent
UNITED STATES PATENTS

| | | |
|---|---|---|
| 2,264,156 | Apple | Nov. 25, 1941 |
| 2,501,475 | Muehfeld | Mar. 21, 1950 |
| 2,661,718 | Ruport | Dec. 8, 1953 |

OTHER REFERENCES

Photograph appearing in the Washington Daily News for Aug. 11, 1938; page 21, entitled Air Conditioning for Biddy.